United States Patent
Hu et al.

(10) Patent No.: US 12,177,147 B2
(45) Date of Patent: Dec. 24, 2024

(54) METHOD AND APPARATUS FOR DETERMINING MEASUREMENT GAP, AND TERMINAL DEVICE

(71) Applicant: GUANGDONG OPPO MOBILE TELECOMMUNICATIONS CORP., LTD., Dongguan (CN)

(72) Inventors: Rongyi Hu, Dongguan (CN); Weijie Xu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 331 days.

(21) Appl. No.: 17/719,096

(22) Filed: Apr. 12, 2022

(65) Prior Publication Data
US 2022/0247534 A1 Aug. 4, 2022

Related U.S. Application Data (63) Continuation of application No. PCT/CN2019/110734, filed on Oct. 12, 2019.

(51) Int. Cl.
*H04W 56/00* (2009.01)
*H04L 5/00* (2006.01)
*H04L 5/14* (2006.01)

(52) U.S. Cl.
CPC .......... *H04L 5/0048* (2013.01); *H04L 5/0032* (2013.01); *H04L 5/0094* (2013.01); *H04L 5/14* (2013.01)

(58) Field of Classification Search
CPC ... H04L 5/0048; H04L 5/0032; H04L 5/0094; H04L 5/14
USPC ........................................................ 370/280
See application file for complete search history.

(56) References Cited

FOREIGN PATENT DOCUMENTS

| | | |
|---|---|---|
| CN | 109391983 A | 2/2019 |
| CN | 109788497 A | 5/2019 |
| WO | 2019/101299 A1 | 5/2019 |

OTHER PUBLICATIONS

Extended European Search Report issued in corresponding European application No. 19948291.0, mailed Oct. 6, 2022.
RAN4, "Response LS on UE capability for the need of measurement gaps in NR standalone", R4-1900950, 3GPP TSG-RAN WG4 Meeting #90 Athens, Greece, Feb. 25-Mar. 1, 2019.
CMCC, "Discussion on CSI-RS based RRM requirements", R4-1910934, 3GPP TSG-RAN WG4 Meeting #90Bis Chongqing, China, Oct. 14-18, 2019.
Priority Review issued in corresponding Chinese application No. 202210582619.2, mailed Jun. 7, 2023.
Notice of Allowance issued in corresponding European application No. 19948291.0, mailed Jul. 10, 2023.
First Office Action issued in corresponding Chinese application No. 202210582619.2, mailed Jun. 16, 2023.

(Continued)

*Primary Examiner* — Sai Ming Chan
(74) *Attorney, Agent, or Firm* — BAYES PLLC (57) ABSTRACT

Provided are a method and apparatus for determining a measurement gap, and a terminal device. The method comprises: a terminal device determining, on the basis of a positional relationship between a first signal and a first BWP and a subcarrier spacing of the first signal, whether measurement of the first signal needs a measurement gap, wherein the first BWP is an active BWP of a serving cell, and the first signal is a reference signal sent by a target cell.

12 Claims, 3 Drawing Sheets

(56) References Cited

OTHER PUBLICATIONS

International Search Report issued in corresponding International Application No. PCT/CN2019/110734, mailed Jun. 30, 2020, 27 pages.
Written Opinion of the International Searching Authority issued in corresponding International Application No. PCT/CN2019/110734, mailed Jun. 30, 2020, 9 pages.
"3rd Generation Partnership Project; Technical Specification Group Radio Access Network; NR; Requirements for support of radio resource management (Release 15)", 3GPP TS 38.133 V15.6.0 (Jun. 2019), 992 pages.
"Scenarios of Measurement Gap Considering Bandwidth Part", Agenda Item: 10.2.3, Source: Samsung, 3GPP TSG RAN WG2 #99bis, R2-1711607, Prague, Czech Republic, Oct. 9 to 13, 2017, 6 pages.
"3rd Generation Partnership Project; Technical Specification Group Radio Access Network; NR; Physical layer procedures for control (Release 15) The present", 3GPP TS 38.213 V15.6.0 (Jun. 2019), 107 pages.
"Summary of the email discussion [105bis#05][NR/R15] Measurement gap coordination in EN-DC (Nokia)", Agenda item: 10.2.2, Source: Nokia, Nokia Shanghai Bell, 3GPP TSG-RAN WG2 Meeting #106, R2-1906685, Reno, USA, May 13-17, 2019, 15 pages.
"3rd Generation Partnership Project; Technical Specification Group Radio Access Network; NR; Radio Resource Control (RRC) protocol specification (Release 15)", 3GPP TS 38.331 V15.6.0 (Jun. 2019), 517 pages.

Fig. 1 determining, by a terminal device, whether measurement of a first signal needs a measurement gap based on a sub-carrier space of the first signal and a positional relationship between the first signal and a first BWP, wherein the first BWP is an active BWP of a serving cell, and the first signal is a reference signal sent by a target cell — 201

Fig. 5 apparatus for determining
measurement gap determining unit 601

METHOD AND APPARATUS FOR DETERMINING MEASUREMENT GAP, AND TERMINAL DEVICE

CROSS REFERENCE TO RELATED APPLICATION

This application is a continuation of International Application No. PCT/CN2019/110734, filed on Oct. 12, 2019, the contents of which is incorporated herein by reference in its entirety.

TECHNICAL FIELD

Embodiments of the present disclosure relate to the field of mobile communication technologies, and more particularly, to a method and apparatus for determining a measurement gap, and a terminal device.

BACKGROUND

A purpose of the measurement gap (MG) is to create a small gap in which a terminal device measures a target cell. For inter-frequency measurement, Rel-15 stipulates that the measurement gap must be configured. As a result, for measurements that do not require the measurement gap, loss of system throughput would be caused. Due to this reason, it is necessary to consider scenarios where the inter-frequency measurement does not need to be configured with the measurement gap, and how to ascertain which scenarios do not need to be configured with the measurement gap remains to be discussed.

SUMMARY

Embodiments of the present disclosure provide a method and apparatus for determining a measurement gap, and a terminal device.

The method for determining the measurement gap provided by an embodiment of the present disclosure includes: determining, by a terminal device, whether measurement of a first signal needs a measurement gap based on a sub-carrier space of the first signal and a positional relationship between the first signal and a first bandwidth part (BWP), wherein the first BWP is an active BWP of a serving cell, and the first signal is a reference signal sent by a target cell.

The apparatus for determining the measurement gap provided by an embodiment of the present disclosure is applied to a terminal device. The apparatus includes: a determining unit, configured to determine whether measurement of a first signal needs a measurement gap based on a sub-carrier space of the first signal and a positional relationship between the first signal and a first BWP, wherein the first BWP is an active BWP of a serving cell, and the first signal is a reference signal sent by a target cell.

The terminal device provided by an embodiment of the present disclosure includes a processor and a memory. The memory is configured to store a computer program, and the processor is configured to call and run the computer program stored in the memory to execute the method for determining the measurement gap as described above.

A chip provided by an embodiment of the present disclosure is configured to implement the method for determining the measurement gap as described above.

Specifically, the chip includes: a processor, configured to call and run a computer program from a memory, so that a device installed with the chip performs the method for determining the measurement gap as described above.

A computer-readable storage medium provided by an embodiment of the present disclosure is configured to store a computer program that causes a computer to execute the method for determining the measurement gap as described above.

A computer program product provided by an embodiment of the present disclosure includes computer program instructions, which cause a computer to execute the method for determining the measurement gap as described above.

A computer program provided by an embodiment of the present disclosure, when run on a computer, causes the computer to perform the method for determining the measurement gap as described above.

Through the above technical solutions, the following factors are considered when determining whether the measurement of the first signal needs the measurement gap: the positional relationship between the first signal and the first BWP; and the sub-carrier space of the first signal. Thus, it is possible to ascertain the scenarios where the measurement gap is not required in the inter-frequency measurement based on the above factors.

BRIEF DESCRIPTION OF THE DRAWINGS

The accompanying drawings, which are incorporated in and constitute a part of the present disclosure, illustrate embodiments consistent with the present disclosure and, together with the description, serve to explain the principle of the present disclosure, and do not expose any improper limitation on the present disclosure. In the drawings.

DETAILED DESCRIPTION

The technical solutions in embodiments of the present disclosure will be described below with reference to the accompanying drawings in embodiments of the present disclosure. Obviously, the described embodiments are part of embodiments of the present disclosure, but not all of the embodiments.

Based on the embodiments in the present disclosure, all other embodiments obtained by a person of ordinary skill in the art without creative efforts shall fall within the protection scope of the present disclosure.

The technical solutions according to embodiments of the present disclosure may be applied to a variety of communications systems, such as a Long Term Evolution ("LTE" for short) system, an LTE Frequency Division Duplex ("FDD" for short) system, an LTE Time Division Duplex ("TDD" for short) system, a 5G system, a future communication system or the like.

Figure 1:
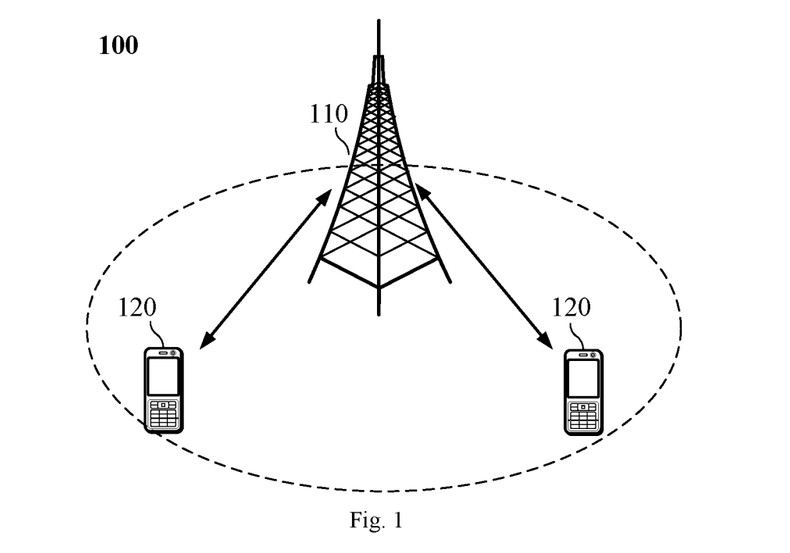
FIG. 1 is a schematic diagram of a communication system architecture provided by an embodiment of the present disclosure.

Exemplarily, a communication system 100 applied in an embodiment of the present disclosure is shown in FIG. 1. The communication system 100 may include a network device 110. The network device 110 may be a device communicating with a terminal 120 (or referred to as a communication terminal or a terminal). The network device 110 may provide communication coverage over a specific geographic region, and may communicate with the terminal located within the coverage region. Optionally, the network device 110 may be an evolutional node B (eNB or eNodeB) in a long term evolution (LTE) system, or a radio controller in a cloud radio access network (CRAN). Alternatively, the network device may be a mobile switching center, a relay station, an access point, a vehicle device, a wearable device, a concentrator, a switchboard, a network bridge, a router, a network-side device in a 5th generation (5G) network, or a network device in a future communication system, and the like.

The communication system 100 further includes at least one terminal 120 located within a coverage range of the network device 110. The "terminal" used herein includes, but not limited to, connection via a wired line, such as connection via public switched telephone networks (PSTN), a digital subscriber line (DSL), a digital cable, and a direct cable; and/or another data connection/network; and/or via a wireless interface, for example, for a cellular network, a wireless local area network (WLAN), a digital television network such as a DVB-H network, a satellite network, and an AM-FM broadcast transmitter; and/or an apparatus of another terminal, which is configured to receive/transmit a communication signal; and/or an Internet of things (IoT) device. The terminal configured to realize communication through a wireless interface may be referred to as a "wireless communication terminal", a "wireless terminal", or a "mobile terminal". Examples of the mobile terminal include, but not limited to, a satellite or cellular phone, and a personal communications system (PCS) terminal that may combine a cellular radiotelephone with data processing, facsimile, and data communication capabilities; a radiotelephone, a pager, an Internet/intranet access, a Web browser, a notepad, a calendar, and/or a personal digital assistant (PDA) of a global positioning system (GPS) receiver; and a conventional laptop and/or palmtop receiver or other electronic apparatuses including radiotelephone transceivers. The terminal may refer to an access terminal, User Equipment (UE), a user unit, a user station, a mobile station, a mobile platform, a remote station, a remote terminal, a mobile device, a user terminal, a terminal, a wireless communication device, a user agent, or a user apparatus. The access terminal may be a cellular phone, a cordless telephone, a session initiation protocol (SIP) telephone, a wireless local loop (WLL) station, a PDA, a handheld device having a wireless communication function, a computation device, or other processing devices connected to a radio modem, a vehicle device, a wearable device, a terminal in a 5G network, or a terminal in the PLMN that will be evolved in the future, and the like.

Optionally, device to device (D2D) communication may be realized among the terminals 120.

Optionally, a 5G communication system or 5G network may also be referred to as a new radio (NR) system or NR network.

FIG. 1 exemplarily illustrates one network device and two terminals. Optionally, the communication system 100 may include a plurality of network devices, and a coverage range of each network device may include other numbers of terminals, which is not limited by embodiments of the present disclosure.

Optionally, the communication system 100 may also include other network entities such as a network controller and a mobile management entity, which is not limited by embodiments of the present disclosure.

It should be understood that a device having a communication function in a network/system in an embodiment of the present disclosure may be referred to as a communication device. The communication system 100 shown in FIG. 1 is taken as an example. The communication device may include a network device 110 and a terminal 120 which have communication functions. The network device 110 and the terminal 120 may be the above-mentioned specific devices, and descriptions thereof are omitted herein. The communication device may also include other devices in the communication system 100, such as other network entities including the network controller, the mobile management entity, and the like, which is not limited by embodiments of the present disclosure.

It should be understood that the terms "system" and "network" herein may often be used interchangeably herein. The term "and/or" herein only refers to an association relationship that describes associated objects, and represents that there may be three relationships.

For example, A and/or B may represent situations as follow: A exists alone; A and B exist simultaneously; and B exists alone.

In addition, the character "/" herein generally indicates that front and back associated objects are in an "or" relationship.

In order to facilitate understanding the technical solutions of embodiments of the present disclosure, technical solutions related to embodiments of the present disclosure are described below.

Intra-Frequency Measurement and Inter-Frequency Measurement

For a synchronization signal block (SSB), if center frequency points and sub-carrier spaces (SCS) of a SBB of a serving cell and a SSB of a target cell are the same, measurement for the SSB of the target cell belongs to the intra-frequency measurement; and otherwise, measurement for the SSB of the target cell belongs to the inter-frequency measurement.

For a channel status indicator reference signal (CSI-RS), if a CSI-RS of the target cell is included in a CSI-RS of the serving cell, and the SCS of the target cell is the same as the SCS of the serving cell, measurement for the CSI-RS of the target cell belongs to the intra-frequency measurement; and otherwise, measurement for the CSI-RS of the target cell belongs to the inter-frequency measurement.

Measurement Gap

In NR, per UE measurement gap (or per UE gap) or per frequency range (FR) measurement gap (or per FR gap) can be configured.

per UE gap: only one can be configured, namely gapUE, used for FR1 and FR2 frequency measurement. With respect to per UE gap, a master node (MN) determines configuration information of the gap (i.e., gapUE).

per FR gap: two can be configured independently, namely gapFR1 and/or gapFR2, wherein the gapFR1 is used for FR1 frequency measurement, and the gapFR2 is used for FR2 frequency measurement. With respect to per FR gap, MN determines configuration information of the gapFR1, and a secondary node (SN) determines configuration information of the gapFR2.

A parameter of the measurement gap is configured by MeasgapConfig. An information element of the MeasgapConfig is shown in table 1 below, where in the MeasgapConfig, the gapFR1 is used to indicate measurement gap configuration that applies to the FR1. In the case of EN-DC, the gapFR1 cannot be set up by NR RRC, and only LTE RRC can configure the gapFR1. The gapFR2 is used to indicate measurement gap configuration that applies to the FR2. The gapUE is used to indicate measurement gap configuration that applies to all frequencies (including FR1 and FR2). In the case of EN-DC, the gapUE cannot be set up by NR RRC, and only LTE RRC can configure the gapUE.

TABLE 1

```
MeasGapConfig ::=       SEQUENCE {
gapFR2                      SetupRelease { GapConfig }       OPTIONAL, -- Need M
gapFR1                      SetupRelease { GapConfig }       OPTIONAL, -- Need M
gapUE                       SetupRelease { GapConfig }       OPTIONAL -- Need M
  ]]
}
GapConfig ::=           SEQUENCE {
  gapOffset                 INTEGER (0..159),
  mgl                       ENUMERATED {ms1dot5, ms3, ms3dot5, ms4, ms5dot5, ms6},
  mgrp                      ENUMERATED {ms20, ms40, ms80, ms160},
  mgta                      ENUMERATED {ms0, ms0dot25, ms0dot5},
  ...
}
```

It should be noted that the gapUE and the gapFR1/gapFR2 cannot be configured at the same time. For a UE that supports EN-DC, gapUE and gapFR1 can only be configured by E-UTRA.

Measurement Gap Sharing Scheme

The measurement gap sharing scheme allows multiple measurements to share the measurement gap. The measurement gap sharing scheme is configured by a network (such as mesGapSharingScheme). Specifically, the measurement gap sharing scheme is configured by two bits, wherein 00 represents all frequency points equally divide opportunities for the measurement gap; and 01, 10, and 11 correspond to X values of 25, 50, 75 respectively, and the X value is used to determine ratios of the intra-frequency measurement and the inter-frequency measurement occupying the measurement gap. The ratio of the intra-frequency measurement occupying the measurement gap is $K_{intra}=1/X*100$, and the ratio of the inter-frequency measurement occupying the measurement gap is $K_{inter}=1/(100-X)*100$.

For the inter-frequency measurement, Rel-15 stipulates that the measurement gap must be configured, while Rel-16 considers supporting the measurement under certain conditions without configuring the measurement gap.

The technical solution of an embodiment of the present disclosure provides several conditions (or several scenarios) in which the measurement gap is not required to be configured. Further, if the inter-frequency measurement does not need to be configured with the measurement gap, new transmission restrictions and scheduling or configuration changes of, for example, the measurement gap sharing scheme may be caused.

For different scenarios, if the corresponding transmission restrictions are not well defined, unnecessary transmission interruptions or transmission conflicts may occur, resulting in poor measurement results and affecting performances of radio resource management (RRM) measurement.

Therefore, an embodiment of the present disclosure proposes a more effective solution to solve the transmission restrictions during the inter-frequency measurement, and provides a reasonable scheduling solution that can satisfy normal data transmission and transmission interruption caused by measurement no matter whether there is a measurement gap or not. The technical solutions of embodiments of the present disclosure will be described in detail below.

Figure 2:
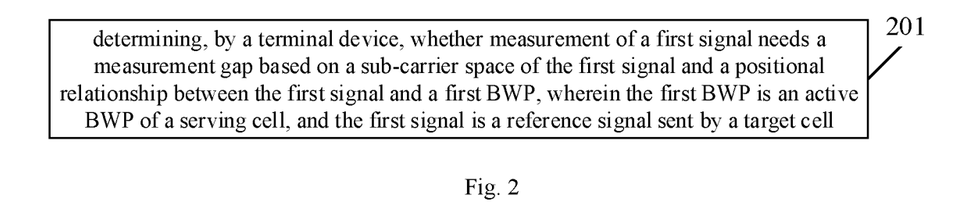
FIG. 2 is a schematic flowchart of a method for determining a measurement gap provided by an embodiment of the application.

FIG. 2 is a schematic flowchart of a method for determining a measurement gap provided by an embodiment of the present disclosure. As shown in FIG. 2, the method for determining the measurement gap includes the following steps.

In step 201, a terminal device determines whether measurement of a first signal needs a measurement gap based on a sub-carrier space of the first signal and a positional relationship between the first signal and a first BWP, wherein the first BWP is an active BWP of a serving cell, and the first signal is a reference signal sent by a target cell.

In an embodiment of the present disclosure, the measurement of the first signal belongs to inter-frequency measurement.

In an optional implementation of the present disclosure, the first signal is a SSB or a CSI-RS.

The following describes how to determine whether the measurement of the first signal needs the measurement gap in connection with different cases.

Case 1: a center frequency point of the first signal is different from that of a second signal, and a sub-carrier space of the second signal is the same as the sub-carrier space of the first BWP, wherein the second signal is a reference signal sent by the serving cell.

1) If the first signal is within the first BWP, and the sub-carrier space of the first signal is the same as the sub-carrier space of the second signal and the sub-carrier space of the first BWP, the measurement of the first signal does not need the measurement gap.

Further, there is no transmission restriction for the terminal device within a first time range, wherein the first time range is determined based on a time domain position of the first signal.

2) If the first signal is within the first BWP, and the sub-carrier space of the first signal is different from the sub-carrier space of the first BWP, the measurement of the first signal does not need the measurement gap.

Further, 2.1) in a case where the first signal belongs to a time-division multiplexing (TDD) band, there is a transmission restriction for the terminal device within the first time range, wherein the first time range is determined based on the time domain position of the first signal. Optionally, the transmission restriction here refers to a restriction on sending.

Further, 2.2) in a case where the frequency domain position of the first signal belongs to FR1, if simultaneous reception of the first signal and data is supported by the terminal device, there is no transmission restriction for the terminal device within the first time range, wherein the first time range is determined based on the time domain position of the first signal.

Further, 2.3) in a case where the frequency domain position of the first signal belongs to FR1, if the simultaneous reception of the first signal and the data is not supported by the terminal device, there is a transmission restriction for the terminal device within the first time range, wherein the first time range is determined based on the time domain position of the first signal. Optionally, the transmission restriction here refers to restrictions on sending and receiving.

Further, 2.4) in a case where the frequency domain position of the first signal belongs to FR2, there is a transmission restriction for the terminal device within the first time range, wherein the first time range is determined based on the time domain position of the first signal. Optionally, the transmission restriction here refers to restrictions on sending and receiving.

It should be noted that FR1 and FR2 in embodiments of the present disclosure refer to NR FR1 and NR FR2. A frequency range of NR FR1 usually refers to a 5G Sub-6 GHz band (being lower than 6 GHz), and may also be extended to sub-7 GHz (being lower than 7 GHz) in the future, and a frequency range of NR FR2 usually refers to a 5G millimeter wave band.

Case 2: the center frequency point of the first signal is different from that of the second signal, and the sub-carrier space of the second signal is different from the sub-carrier space of the first BWP, wherein the second signal is the reference signal sent by the serving cell.

1) If the first signal is within the first BWP, the sub-carrier space of the first signal is the same as the sub-carrier space of the second signal, and the sub-carrier space of the first signal is different from the sub-carrier space of the first BWP, the measurement of the first signal does not need the measurement gap.

Further, 1.1) in a case where the frequency domain position of the first signal belongs to the TDD band, there is a transmission restriction for the terminal device within the first time range, wherein the first time range is determined based on the time domain position of the first signal. Optionally, the transmission restriction here refers to a restriction on sending.

Further, 1.2) in a case where the frequency domain position of the first signal belongs to the FR1, if simultaneous reception of the first signal and data is supported by the terminal device, there is no transmission restriction for the terminal device within the first time range, wherein the first time range is determined based on the time domain position of the first signal.

Further, 1.3) in a case where the frequency domain position of the first signal belongs to the FR1, if the simultaneous reception of the first signal and data is not supported by the terminal device, there is a transmission restriction for the terminal device within the first time range, wherein the first time range is determined based on the time domain position of the first signal. Optionally, the transmission restriction here refers to restrictions on sending and receiving.

Further, 1.4) in a case where the frequency domain position of the first signal belongs to the FR2, there is a transmission restriction for the terminal device within the first time range, wherein the first time range is determined based on the time domain position of the first signal. Optionally, the transmission restriction here refers to restrictions on sending and receiving.

2) If the first signal is within the first BWP, and the sub-carrier space of the first signal is the same as the sub-carrier space of the second signal and the sub-carrier space of the first BWP, the measurement of the first signal does not need the measurement gap.

Further, there is no transmission restriction for the terminal device within the first time range, and the first time range is determined based on the time domain position of the first signal.

3) If the first signal is within the first BWP, the sub-carrier space of the first signal is different from the sub-carrier space of the second signal and the sub-carrier space of the first BWP, and a frequency domain position of the first signal belongs to a TDD band, the measurement of the first signal does not need the measurement gap.

Further, there is a transmission restriction for the terminal device within the first time range, and the first time range is determined based on the time domain position of the first signal.

4) If the first signal is within the first BWP, the sub-carrier space of the first signal is different from the sub-carrier space of the second signal and the sub-carrier space of the first BWP, a frequency domain position of the first signal belongs to the FR1, and simultaneous reception of the first signal and data is supported by the terminal device or multiple sub-carrier spaces are supported by the terminal device, the measurement of the first signal does not need the measurement gap.

Further, there is no transmission restriction for the terminal device within the first time range, and the first time range is determined based on the time domain position of the first signal.

In an optional implementation, the multiple sub-carrier spaces supported by the terminal device include the sub-carrier space of the first BWP, the sub-carrier space of the first signal, and the sub-carrier space of the second signal.

5) If the first signal is within the first BWP, the sub-carrier space of the first signal is different from the sub-carrier space of the second signal and the sub-carrier space of the first BWP, a frequency domain position of the first signal belongs to the FR1, and simultaneous reception of the first signal and data is not supported by the terminal device, the measurement of the first signal needs the measurement gap.

6) If the first signal is within the first BWP, the sub-carrier space of the first signal is different from the sub-carrier space of the second signal and the sub-carrier space of the first BWP, and a frequency domain position of the first signal belongs to the FR2, the measurement of the first signal does not need the measurement gap.

Further, there is a transmission restriction for the terminal device within the first time range, and the first time range is determined based on the time domain position of the first signal.

Case 3: the center frequency point of the first signal is the same as that of the second signal, and the sub-carrier space of the second signal is different from the sub-carrier space of the first BWP, wherein the second signal is the reference signal sent by the serving cell.

Here, the case 3 and the case 2 have the same way for determining whether the measurement gap is needed, and the same transmission restriction. In order to avoid repetitive description, the solution in the case 2 is also applicable to the case 3.

It should be noted that the above-mentioned technical solutions in embodiments of the present disclosure are also applicable to a network device side. The network device may be a base station, such as gNB. The network device determines whether the measurement gap is needed, and then determines whether it is necessary to configure the measurement gap for the terminal device.

In an optional implementation, the transmission restriction means that there is no capability for the terminal device to send an uplink signal and/or receive a downlink signal on the first signal, n1 symbols before the first signal, and n2 symbols after the first signal within a first timing window, wherein n1 and n2 are integers greater than or equal to 0. In another optional implementation, the transmission restriction means that there is no capability for the terminal device to send an uplink signal and/or receive a downlink signal within the first timing window.

It should be noted that the transmission restriction is classified into the following two types.

The first type is restriction on sending, which restriction on sending means that the terminal device cannot send an uplink signal on the first signal, n1 symbols before the first signal, and n2 symbols after the first signal within the first timing window; or that the terminal device cannot send an uplink signal within the first timing window.

The second type is restriction on receiving, which restriction on receiving means that the terminal device cannot receive a downlink signal on the first signal, n1 symbols before the first signal, and n2 symbols after the first signal within the first timing window; or that the terminal device cannot receive a downlink signal within the first timing window.

Further, the uplink signal in the above solution includes at least one of the following: a physical uplink control channel (PUCCH), a physical uplink shared channel (PUSCH), and a sounding reference signal (SRS).

Further, the downlink signal in the above solution includes at least one of the following: a physical downlink control channel (PDCCH), a physical downlink shared channel (PDSCH), a tracking reference signal (TRS), and CSI-RS for channel quality indication (CQI).

Further, the first timing window in the above solution is a SSB measurement timing configuration (SMTC) window.

The foregoing technical solutions of embodiments of the present disclosure are described below with specific examples. The following examples take SSB-based measurement as examples for description.

Example 1

Figure 3:
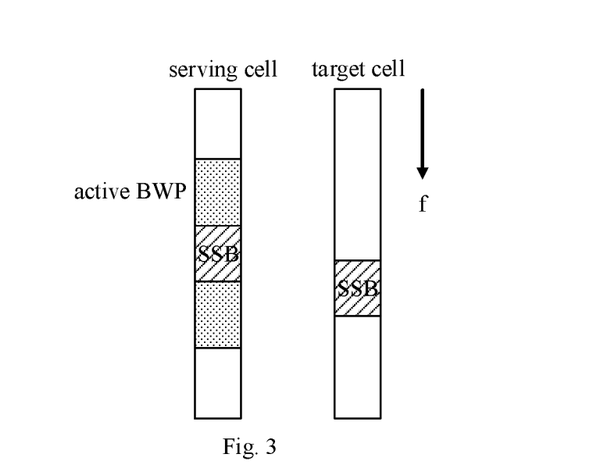
FIG. 3 is a diagram of a relationship between a SSB and an active BWP in example 1 provided by an embodiment of the present disclosure.

With reference to FIG. 3, a measurement object is the SSB of the target cell, and measurement of the SSB of the target cell belongs to the inter-frequency measurement. Regardless of whether the SSB of the serving cell is within the active BWP, the SSB of the target cell is within the active BWP, but has a center frequency point different from the center frequency point of the SSB of the serving cell. The sub-carrier space of the SSB of the serving cell is SCS1, the sub-carrier space of the active BWP is SCS2, and the sub-carrier space of the SSB of the serving cell is SCS3. SCS1 is the same as SCS2.

1-1: if SCS3=SCS1=SCS2, measurement for the measurement object does not need the measurement gap, the network side may not configure the measurement gap, and there is no transmission restriction.

1-2: if SCS3 is different from SCS2, measurement for the measurement object does not need the measurement gap, the network side may not configure the measurement gap, but the measurement may bring about the following transmission restrictions.

(1) If the measurement object belongs to the TDD band, there are restrictions on sending as below: PUCCH, PUSCH and SRS cannot be sent on the measured SSB, n1 symbols before the measured SSB, and n2 symbols after the measured SSB within the SMTC window, wherein n1 and n2 are integers greater than or equal to 0. In an example, n1=n2=1.

(2) If the measurement object belongs to the FR1, then the following applies.

If the terminal device supports simultaneous reception of data and SSB (i.e., simultaneousRxDataSSB-DiffNumerology), measurement for the measurement object does not need the measurement gap, the network side may not configure the measurement gap, and there is no transmission restriction.

If the terminal device does not support simultaneousRxDataSSB-DiffNumerology, measurement for the measurement object does not need the measurement gap, the network side may not configure the measurement gap, but there may be restrictions on sending and receiving as below: PUCCH, PUSCH, and SRS cannot be sent, and PDCCH, PDSCH, TRS, and CSI-RS for CQI cannot be received on the measured SSB, n1 symbols before the measured SSB, and n2 symbols after the measured SSB within the SMTC window, wherein n1 and n2 are integers greater than or equal to 0. In an example, n1=n2=1.

(3) If the measurement object belongs to FR2, regardless of whether the terminal device supports simultaneousRxDataSSB-DiffNumerology, measurement for the measurement object does not need the measurement gap, the network side may not configure the measurement gap, but there may be restrictions on sending and receiving as below: PUCCH, PUSCH, and SRS cannot be sent, and PDCCH, PDSCH, TRS, and CSI-RS for CQI cannot be received on the measured SSB, n1 symbols before the measured SSB, and n2 symbols after the measured SSB within the SMTC window, wherein n1 and n2 are integers greater than or equal to 0. In an example, n1=n2=1.

Example 2

Figure 4:
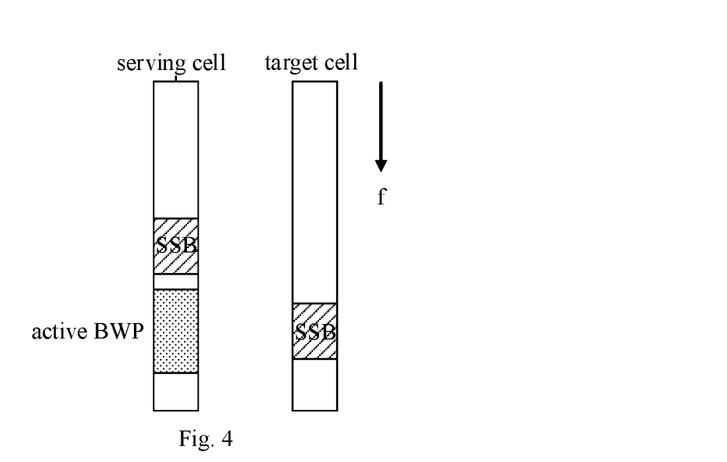
FIG. 4 is a diagram of a relationship between a SSB and an active BWP in example 2 provided by an embodiment of the present disclosure.

With reference to FIG. 4, the measurement object is the SSB of the target cell, and measurement of the SSB of the target cell belongs to the inter-frequency measurement. Regardless of whether the SSB of the serving cell is within the active BWP, the SSB of the target cell is within the active BWP, but has a center frequency point different from the center frequency point of the SSB of the serving cell. The sub-carrier space of the SSB of the serving cell is SCS1, sub-carrier space of the active BWP is SCS2, and the sub-carrier space of the SSB of the serving cell is SCS3. SCS1 is different from SCS2.

2-1: if SCS3 is the same as SCS1, and SCS3 is different from SCS2, measurement for the measurement object does not need the measurement gap, the network side may not configure the measurement gap, but the measurement may bring about the transmission restriction, which transmission restriction may refer to 1-2 in the previous example 1.

2-2: if SCS3 is the same as SCS1 and SCS2, regardless of whether the terminal device supports simultaneousRxDataSSB-DiffNumerology, measurement for the measurement object does not need the measurement gap, the network side may not configure the measurement gap, and there is no transmission restriction.

2-3: if SCS3 is different from SCS1 and SCS2, then the following applies.

(1) If the measurement object belongs to the TDD band, there are restrictions on sending as below: PUCCH, PUSCH, and SRS cannot be sent on the measured SSB, n1 symbols before the measured SSB, and n2 symbols after the measured SSB within the SMTC window, wherein n1 and n2 are integers greater than or equal to 0. In an example, n1=n2=1.

(2) If the measurement object belongs to the FR1, then the following applies.

If the terminal device supports simultaneousRxDataSSB-DiffNumerology or it is indicated that the terminal device supports FFT of three SCSs (SCS1, SCS2 and SCS3) at the same time through a new capability, measurement for the measurement object does not need the measurement gap, the network side may not configure the measurement gap, and there is no transmission restriction.

If the terminal device does not support simultaneousRxDataSSB-DiffNumerology, measurement for the measurement object needs the measurement gap, and the network side can configure the measurement gap.

(3) If the measurement object belongs to FR2, regardless of whether the terminal device supports simultaneousRxDataSSB-DiffNumerology, measurement for the measurement object does not need the measurement gap, the network side may not configure the measurement gap, but there may be restrictions on sending and receiving as below: PUCCH, PUSCH, and SRS cannot be sent, and PDCCH, PDSCH, TRS, and CSI-RS for CQI cannot be received on the measured SSB, n1 symbols before the measured SSB, and n2 symbols after the measured SSB within the SMTC window, wherein n1 and n2 are integers greater than or equal to 0. In an example, n1=n2=1.

Example 3

Figure 5:
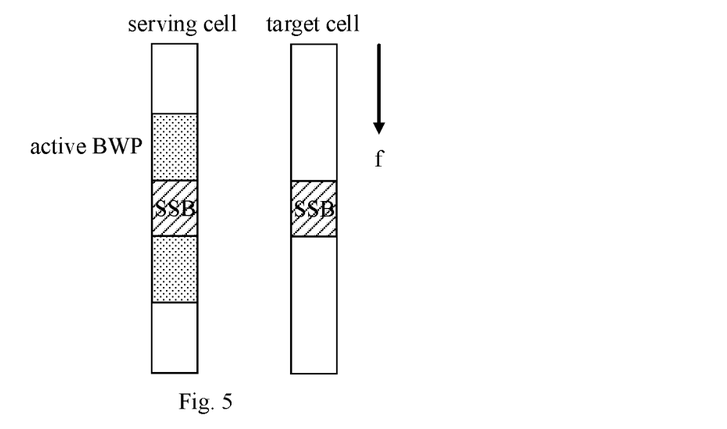
FIG. 5 is a diagram of a relationship between a SSB and an active BWP in example 3 provided by an embodiment of the present disclosure.

With reference to FIG. 5 the measurement object is the SSB of the target cell, and measurement of the SSB of the target cell belongs to the inter-frequency measurement. Regardless of whether the SSB of the serving cell is within the active BWP, the SSB of the target cell is within the active BWP, but has the same center frequency point as the center frequency point of the SSB of the serving cell. The sub-carrier space of the SSB of the serving cell is SCS1, the sub-carrier space of the active BWP is SCS2, and the sub-carrier space of the SSB of the serving cell is SCS3. SCS1 is different from SCS2.

3-1: If SCS3 is the same as SCS1, and SCS3 is different from SCS2, measurement for the measurement object does not need the measurement gap, the network side may not configure the measurement gap, but the measurement may bring about the transmission restriction, which transmission restriction may refer to 1-2 in the previous example 1.

3-2: If SCS3 is the same as SCS1 and SCS2, regardless of whether the terminal device supports simultaneousRxDataSSB-DiffNumerology, measurement for the measurement object does not need the measurement gap, the network side may not configure the measurement gap, and there is no transmission restriction.

3-3: If SCS3 is different from SCS1 and SCS2, then the following applies.

(1) If the measurement object belongs to the TDD band, there are restrictions on sending as below: PUCCH, PUSCH, and SRS cannot be sent on the measured SSB, n1 symbols before the measured SSB, and n2 symbols after the measured SSB within the SMTC window, wherein n1 and n2 are integers greater than or equal to 0. In an example, n1=n2=1.

(2) If the measurement object belongs to the FR1, then the following applies.

If the terminal device supports simultaneousRxDataSSB-DiffNumerology or it is indicated that the terminal device support FFT of three SCSs (SCS1, SCS2 and SCS3) at the same time through a new capability, measurement for the measurement object does not need the measurement gap, the network side may not configure the measurement gap, and there is no transmission restriction.

If the terminal device does not support simultaneousRxDataSSB-DiffNumerology, measurement for the measurement object needs the measurement gap, and the network side can configure the measurement gap.

(3) If the measurement object belongs to FR2, regardless of whether the terminal device supports simultaneousRxDataSSB-DiffNumerology, measurement for the measurement object does not need the measurement gap, the network side may not configure the measurement gap, but there may be restrictions on sending and receiving as below: PUCCH, PUSCH, and SRS cannot be sent, and PDCCH, PDSCH, TRS, and CSI-RS for CQI cannot be received on the measured SSB, n1 symbols before the measured SSB, and n2 symbols after the measured SSB within the SMTC window, wherein n1 and n2 are integers greater than or equal to 0. In an example, n1=n2=1.

In an optional implementation of the present disclosure, for the inter-frequency measurement of FR1, based on whether there is RRC to configure the terminal device to report the SSB index (indicating a cell identity), there are further additional transmission restrictions as follows. 1) If derivedSSB_IndexFromCell is activated, the first time range of the transmission restriction includes a symbol where the SSB is located, n1 symbols before the SSB, and n2 symbols after the SSB, wherein n1 and n2 are integers greater than or equal to 0. In an example, n1=n2=1. 2) If deriveSSB_IndexFromCell is not activated, the first time range of the transmission restriction includes all symbols in the SMTC window where the SSB is located.

It should be noted that, in the above examples, the measured reference signal being the SSB is used as an example for description. The technical solutions of embodiments of the present disclosure are not limited to this, and the reference signal may also be the CSI-RS. For the terminal device that supports the CSI-RS measurement, the above method which takes the SSB as an example is also applicable to the CSI-RS.

A difference between the CSI-RS and the SSB is that definitions of the intra-frequency measurement and the inter-frequency measurement are slightly different. For the SSB, if the center frequency point and the SCS of the SBB of the serving cell are the same as those of the SSB of the target cell, then measurement for the SSB of the target cell belongs to the intra-frequency measurement; and otherwise, measurement for the SSB of the target cell belongs to the inter-frequency measurement.

For the CSI-RS, the CSI-RS of the target cell is included in the CSI-RS of the serving cell, and the SCS of the target cell is the same as the SCS of the serving cell, then measurement for the CSI-RS of the target cell belongs to the intra-frequency measurement; and otherwise, measurement for the CSI-RS of the target cell belongs to the inter-frequency measurement.

In addition, unlike the SSB, the CSI-RS does not set the measurement window (i.e., SMTC window) for the reference signal. Here, for the inter-frequency measurement of FR1, if RRC does not configure the terminal device to report the SSB index (i.e., derivedSSB_IndexFromCell is not activated), the first time range of the transmission restriction may still include a symbol where the measured CSI-RS is located, n1 symbols before the CSI-RS, and n2 symbols after the CSI-RS, while other aspects are basically the same as the SSB-based measurement.

In the technical solutions of embodiments of the present disclosure, for the scenarios that do not need the measurement gap, a resource originally occupied by the measurement gap can be used to improve the system throughput.

Further, the technical solutions of embodiments of the present disclosure propose a transmission scheduling or restriction solution when the measurement gap is not configured for the inter-frequency measurement, and provides a reasonable scheduling solution that can satisfy normal data transmission and transmission interruption caused by measurement no matter whether there is a measurement gap or not. On the other hand, the technical solutions of embodiments of the present disclosure design respective scheduling restriction solutions according to scenarios. This reduces the conflict between data transmission and measurement of the terminal device, and can improve the accuracy and efficiency of RRM measurement.

Figure 6:
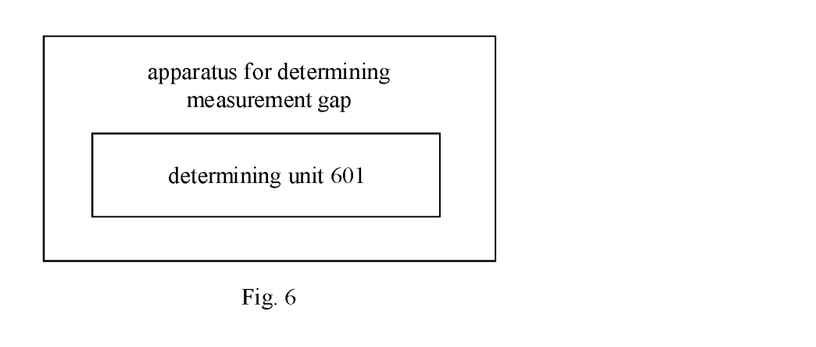
FIG. 6 is a schematic diagram of structural components of an apparatus for determining a measurement gap provided by an embodiment of the application.

FIG. 6 is a schematic diagram of structural components of an apparatus for determining a measurement gap provided by an embodiment of the application, which is applied to a terminal device. As shown in FIG. 6, the apparatus for determining the measurement gap includes: a determining unit 601, configured to determine whether measurement of a first signal needs a measurement gap based on a sub-carrier space of the first signal and a positional relationship between the first signal and a first BWP, wherein the first BWP is an active BWP of a serving cell, and the first signal is a reference signal sent by a target cell.

In an optional implementation, a center frequency point of the first signal is different from that of a second signal, a sub-carrier space of the second signal is the same as the sub-carrier space of the first BWP, and the second signal is a reference signal sent by the serving cell.

In an optional implementation, the determining unit 601 is configured to: if the first signal is within the first BWP, and the sub-carrier space of the first signal is the same as the sub-carrier space of the second signal and the sub-carrier space of the first BWP, determine that the measurement of the first signal does not need the measurement gap.

In an optional implementation, the determining unit 601 is configured to: if the first signal is within the first BWP, and the sub-carrier space of the first signal is different from the sub-carrier space of the first BWP, determine that the measurement of the first signal does not need the measurement gap.

In an optional implementation, in a case where a frequency domain position of the first signal belongs to a TDD band, there is a transmission restriction for the terminal device within a first time range, wherein the first time range is determined based on a time domain position of the first signal.

In an optional implementation, in a case where a frequency domain position of the first signal belongs to the FR1, if simultaneous reception of the first signal and data is supported by the terminal device, there is no transmission restriction for the terminal device within a first time range, wherein the first time range is determined based on a time domain position of the first signal.

In an optional implementation, in a case where a frequency domain position of the first signal belongs to the FR1, if simultaneous reception of the first signal and data is not supported by the terminal device, there is a transmission restriction for the terminal device within a first time range, wherein the first time range is determined based on a time domain position of the first signal.

In an optional implementation, in a case where a frequency domain position of the first signal belongs to the FR2, there is a transmission restriction for the terminal device within a first time range, wherein the first time range is determined based on a time domain position of the first signal.

In an optional implementation, a center frequency point of the first signal is different from that of a second signal, a sub-carrier space of the second signal is different from the sub-carrier space of the first BWP, and the second signal is a reference signal sent by the serving cell.

In an optional implementation, a center frequency point of the first signal is the same as that of a second signal, a sub-carrier space of the second signal is different from the sub-carrier space of the first BWP, and the second signal is a reference signal sent by the serving cell.

In an optional implementation, the determining unit 601 is configured to: if the first signal is within the first BWP, the sub-carrier space of the first signal is the same as the sub-carrier space of the second signal, and the sub-carrier space of the first signal is different from the sub-carrier space of the first BWP, determine that the measurement of the first signal does not need the measurement gap.

In an optional implementation, in a case where a frequency domain position of the first signal belongs to a TDD band, there is a transmission restriction for the terminal device within a first time range, wherein the first time range is determined based on a time domain position of the first signal.

In an optional implementation, in a case where a frequency domain position of the first signal belongs to the FR1, if simultaneous reception of the first signal and data is supported by the terminal device, there is no transmission restriction for the terminal device within a first time range, wherein the first time range is determined based on a time domain position of the first signal.

In an optional implementation, in a case where a frequency domain position of the first signal belongs to the FR1, if simultaneous reception of the first signal and data is not supported by the terminal device, there is a transmission restriction for the terminal device within a first time range, wherein the first time range is determined based on a time domain position of the first signal.

In an optional implementation, in a case where a frequency domain position of the first signal belongs to the FR2, there is a transmission restriction for the terminal device within a first time range, wherein the first time range is determined based on a time domain position of the first signal.

In an optional implementation, the determining unit 601 is configured to: if the first signal is within the first BWP, and the sub-carrier space of the first signal is the same as the sub-carrier space of the second signal and the sub-carrier space of the first BWP, determine that the measurement of the first signal does not need the measurement gap.

In an optional implementation, the determining unit 601 is configured to: if the first signal is within the first BWP, the sub-carrier space of the first signal is different from the sub-carrier space of the second signal and the sub-carrier space of the first BWP, and a frequency domain position of the first signal belongs to a TDD band, determine that the measurement of the first signal does not need the measurement gap.

In an optional implementation, there is a transmission restriction for the terminal device within a first time range, and the first time range is determined based on a time domain position of the first signal.

In an optional implementation, the determining unit 601 is configured to: if the first signal is within the first BWP, the sub-carrier space of the first signal is different from the sub-carrier space of the second signal and the sub-carrier space of the first BWP, a frequency domain position of the first signal belongs to the FR1, and simultaneous reception of the first signal and data is supported by the terminal device or multiple sub-carrier spaces are supported by the terminal device, determine that the measurement of the first signal does not need the measurement gap.

In an optional implementation, there is no transmission restriction for the terminal device within a first time range, and the first time range is determined based on a time domain position of the first signal.

In an optional implementation, the determining unit 601 is configured to: if the first signal is within the first BWP, the sub-carrier space of the first signal is different from the sub-carrier space of the second signal and the sub-carrier space of the first BWP, a frequency domain position of the first signal belongs to the FR1, and simultaneous reception of the first signal and data is not supported by the terminal device, determine that the measurement of the first signal needs the measurement gap.

In an optional implementation, the determining unit 601 is configured to: if the first signal is within the first BWP, the sub-carrier space of the first signal is different from the sub-carrier space of the second signal and the sub-carrier space of the first BWP, and a frequency domain position of the first signal belongs to the FR2, determine that the measurement of the first signal does not need the measurement gap.

In an optional implementation, there is a transmission restriction for the terminal device within a first time range, and the first time range is determined based on a time domain position of the first signal.

In an optional implementation, the transmission restriction means that there is no capability for the terminal device to send an uplink signal and/or receive a downlink signal on the first signal, n1 symbols before the first signal, and n2 symbols after the first signal within a first timing window, wherein n1 and n2 are integers greater than or equal to 0.

In an optional implementation, the transmission restriction means that there is no capability for the terminal device to send an uplink signal and/or receive a downlink signal within a first timing window.

In an optional implementation, the first signal is a SSB or a CSI-RS.

In an optional embodiment, the measurement of the first signal belongs to inter-frequency measurement.

Those skilled in the art should understand that the relevant description of the foregoing apparatus for determining the measurement gap in an embodiment of the present disclosure can be understood with reference to the relevant description of the method for determining the measurement gap in an embodiment of the present disclosure.

Figure 7:
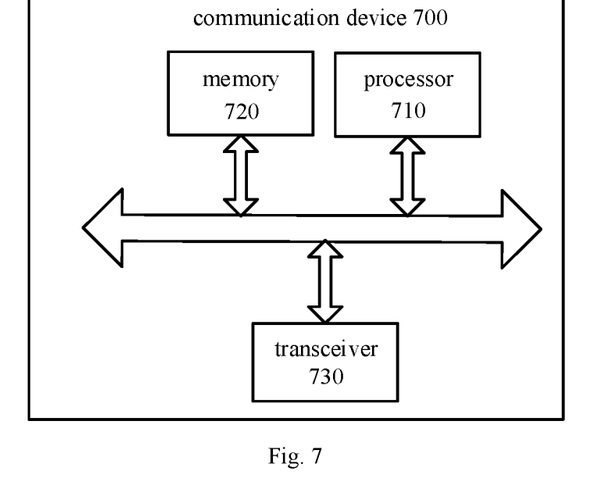
FIG. 7 is a schematic structural diagram of a communication device provided by an embodiment of the present disclosure.

FIG. 7 is a schematic structural diagram of a communication device 700 provided by an embodiment of the present disclosure. The communication device may be a terminal device or a network device. The communication device 700 shown in FIG. 7 includes a processor 710. The processor 710 may call and run a computer program from a memory, to implement the method in an embodiment of the present disclosure.

Optionally, as shown in FIG. 7, the communication device 700 may further include a memory 720. The processor 710 may call and run the computer program from the memory 720, to implement the method in an embodiment of the present disclosure.

The memory 720 may be a component independent of the processor 710, or may be integrated into the processor 710.

Optionally, as shown in FIG. 7, the communication device 700 may further include a transceiver 730. The processor 710 may control the transceiver 730 to communicate with another device. Specifically, the transceiver 730 may transmit information or data to another device, or receive information or data transmitted by another device.

The transceiver 730 may include a transmitter and a receiver. The transceiver 730 may further include an antenna. There may be one or more antennas.

Optionally, the communication device 700 may be the network device in an embodiment of the present disclosure, and the communication device 700 can implement respective procedures implemented by the network device in various methods according to embodiments of the present disclosure. For brevity, details are not described herein again.

Optionally, the communication device 700 may be the mobile terminal/terminal in an embodiment of the present disclosure, and the communication device 700 can implement respective procedures implemented by the mobile terminal/terminal device in various methods according to embodiments of the present disclosure. For brevity, details are not described herein again.

Figure 8:
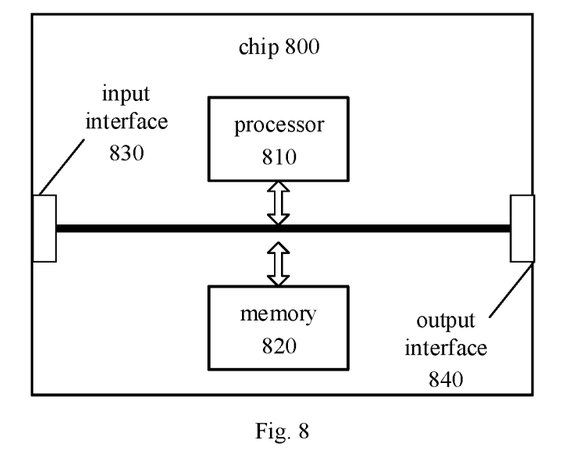
FIG. 8 is a schematic structural diagram of a chip provided by an embodiment of the present disclosure.

FIG. 8 is a schematic structural diagram of a chip provided by an embodiment of the present disclosure. The chip 800 shown in FIG. 8 includes a processor 810. The processor 810 may call a computer program from a memory and run the computer program, to implement the method in an embodiment of the present disclosure.

Optionally, as shown in FIG. 8, the chip 800 may further include a memory 820. The processor 810 may call the computer program from the memory 820 and run the computer program, to implement the method in an embodiment of the present disclosure.

The memory 820 may be a component independent of the processor 810, or may be integrated into the processor 810.

Optionally, the chip 800 may further include an input interface 830. The processor 810 may control the input interface 830 to communicate with another device or chip. Specifically, the input interface 830 may obtain information or data transmitted by another device or chip.

Optionally, the chip 800 may further include an output interface 840. The processor 810 may control the output interface 840 to communicate with another device or chip. Specifically, the output interface 840 may output information or data to another device or chip.

Optionally, the chip may be applied in the network device according to an embodiment of the present disclosure, and the chip can implement respective procedures implemented by the network device in various methods according to embodiments of the present disclosure. For brevity, details are not described herein again.

Optionally, the chip may be applied to the mobile terminal/terminal device in an embodiment of the present disclosure, and the chip can implement respective procedures implemented by the mobile terminal/terminal device in various methods according to embodiments of the present disclosure. For brevity, details are not described herein again.

It should be noted that, the chip mentioned in an embodiment of the present disclosure may also be referred to as a system-level chip, a system chip, a chip system, a system on chip, or the like.

Figure 9:
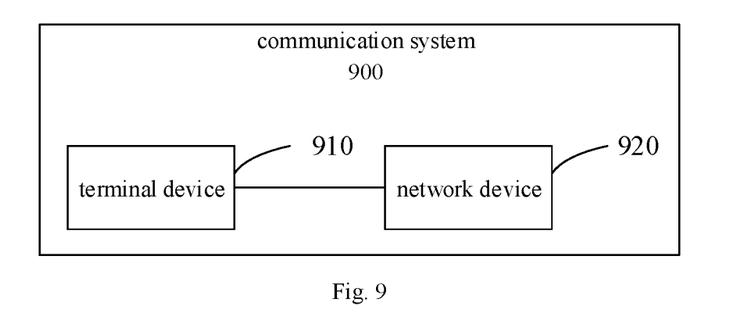
FIG. 9 is a schematic block diagram of a communication system provided by an embodiment of the present disclosure.

FIG. 9 is a schematic structural diagram of a communication system 900 provided by an embodiment of the present disclosure. The communication system 900 shown in FIG. 9 includes a terminal device 910 and a network device 920.

The terminal device 910 can implement respective functions implemented by the terminal device in the foregoing method, and the network device 920 can implement respective functions implemented by the network device in the foregoing method. For brevity, details are not described herein again.

It should be understood that, the processor according to an embodiment of the present disclosure may be an integrated circuit chip, and has the signal processing capability. The steps of the foregoing method embodiment may be implemented by using a hardware integrated logic circuit in the processor and/or implemented by using an instruction in a software form. The foregoing processor may be a general purpose processor, a digital signal processor (DSP), an application specific integrated circuit (ASIC), a field programmable gate array (FPGA), or another programmable logic device, a discrete gate or a transistor logic device, or a discrete hardware component. Various methods, steps and logical block diagrams disclosed in embodiments of the present application can be implemented or performed. The general purpose processor may be a microprocessor, or may be any conventional processor, or the like. Steps of the methods disclosed with reference to embodiments of the present disclosure may be directly executed and completed by means of a hardware decoding processor, or may be executed and completed by using a combination of hardware and software modules in the decoding processor. The software module may be located in a mature storage medium in the field, such as a random access memory, a flash memory, a read-only memory, a programmable read-only memory, an electrically-erasable programmable memory, or a register. The storage medium is located in the memory. The processor reads information from the memory and completes the steps in the foregoing method embodiments in combination with hardware of the processor.

It should be understood that, the memory in an embodiment of the present disclosure may be a volatile memory or a non-volatile memory, or may include both a volatile memory and a non-volatile memory. The non-volatile memory may be a read-only memory (ROM), a programmable ROM (PROM), an erasable PROM (EPROM), an electrically EPROM (EEPROM), or a flash memory. The volatile memory may be a random access memory (RAM), which is used as an external cache. By way of examples but without limitation, many forms of RAM are available, for example, a static random access memory (SRAM), a dynamic random access memory (DRAM), a synchronous dynamic random access memory (SDRAM), a double data rate synchronous dynamic random access memory (DDRSDRAM), an enhanced synchronous dynamic random access memory (ESDRAM), a synclink dynamic random access memory (SLDRAM), and a direct rambus random access memory (DRRAM). It should be noted that, the memory of the system and the method described in an embodiment of the present disclosure is intended to include but not limited to these memories and any other suitable types of memory.

It should be understood that, the memory is an example but not intended for limitation.

For example, the memory in an embodiment of the present disclosure may be alternatively a static RAM (SRAM), a dynamic RAM (DRAM), a synchronous DRAM (SDRAM), a double data rate SDRAM (DDR SDRAM), an enhanced SDRAM (ESDRAM), a synch link DRAM (SLDRAM), a direct rambus RAM (DR RAM), and the like. That is, the memory described in an embodiment of the present disclosure is intended to include but not limited to these memories and any other suitable types of memory.

An embodiment of the present disclosure further provides a computer readable storage medium. The computer readable storage medium is configured to store a computer program.

Optionally, the computer readable storage medium may be applied to the network device in an embodiment of the present disclosure, and the computer program enables a computer to execute a respective procedure implemented by the network device in the method of an embodiment of the present disclosure. For brevity, details are not described herein again.

Optionally, the computer readable storage medium may be applied to the mobile terminal/terminal device in an embodiment of the present disclosure, and the computer program enables the computer to execute a respective procedure implemented by the mobile terminal/terminal device in the method of an embodiment of the present disclosure. For brevity, details are not described herein again.

The present disclosure further provides a computer program product. The computer program product includes computer program instructions.

Optionally, the computer program product may be applied to the network device in an embodiment of the present disclosure, and the computer program instructions enable the computer to execute a respective procedure implemented by the network device in the method of an embodiment of the present disclosure. For brevity, details are not described herein again.

Optionally, the computer program product may be applied to the mobile terminal/terminal device in an embodiment of the present disclosure, and the computer program instructions enable the computer to execute a respective procedure implemented by the mobile terminal/terminal device in the method of an embodiment of the present disclosure. For brevity, details are not described herein again.

The present disclosure further provides a computer program.

Optionally, the computer program may be applied to the network device in an embodiment of the present disclosure. When run on a computer, the computer program enables the computer to execute a respective procedure implemented by the network device in the method of an embodiment of the present disclosure. For brevity, details are not described herein again.

Optionally, the computer program may be applied to the mobile terminal/terminal device in an embodiment of the present disclosure. When run on a computer, the computer program enables the computer to execute a respective procedure implemented by the mobile terminal/terminal device in the method of an embodiment of the present disclosure. For brevity, details are not described herein again.

A person of ordinary skill in the art may be aware that, in connection with the examples described in embodiments disclosed in the present specification, units and algorithm steps may be implemented by using electronic hardware or a combination of computer software and electronic hardware.

Whether these functions are executed by means of hardware or software depends on specific applications and design constraints of the technical solutions. A person skilled in the art may use different methods to implement the described functions for each particular application, but such implementation should not be considered as going beyond the scope of the present disclosure.

A person skilled in the art may clearly understand that, for the purpose of simple and clear description, with respect to specific work processes of the foregoing described system, apparatus, and unit, reference may be made to corresponding process in the foregoing method embodiments, and details are not described herein again.

In several embodiments provided by the present disclosure, it should be understood that the disclosed system, apparatus, and method may be implemented in other ways.

For example, the apparatus embodiments described above are merely examples.

For example, the unit division is merely logical function division, and there may be other divisions in actual implementations.

For example, a plurality of units or components may be combined or integrated into another system, or some features may be ignored or not performed.

In addition, the displayed or discussed mutual couplings or direct couplings or communication connections may be implemented by using some interfaces. The indirect couplings or communication connections between apparatuses or units may be implemented in electrical, mechanical, or other forms.

The units described as separate parts may or may not be physically separate, and the parts displayed as units may or may not be physical units, may be located in one position, or may be distributed across multiple network units. Some of or all of the units may be selected according to actual needs to achieve the objectives of the solutions in embodiments of the present disclosure.

In addition, functional units in various embodiments of the present disclosure may be integrated into one processing unit, or each of the units may exist alone physically, or two or more units may be integrated into one unit.

When the functions are implemented in the form of software functional unit and sold or used as an independent product, the functions may be stored in a computer-readable storage medium. Based on such an understanding, the technical solutions of the present disclosure essentially, or the part contributing to the prior art, or some of the technical solutions, may be implemented in a form of software product.

The software product is stored in a storage medium, and includes several instructions for instructing a computer device (which may be a personal computer, a server, or a network device) to perform all or some of the steps of the methods described in embodiments of the present disclosure. The foregoing storage medium includes any medium that can store program codes, such as a USB flash drive, a removable hard disk, a read-only memory (ROM), a random access memory (RAM), a magnetic disk, or an optical disc.

Described above are merely specific implementations of the present disclosure, but the protection scope of the present disclosure is not limited thereto. Changes or replacements readily figured out by any person skilled in the art within the technical scope disclosed in the present disclosure shall be covered by the protection scope of the present disclosure. Therefore, the protection scope of the present disclosure shall be subject to the protection scope of the claims.

What is claimed is:

1. A method for determining a measurement gap, comprising:
   determining, by a terminal device, whether measurement of a first signal needs a measurement gap based on a sub-carrier space of the first signal and a positional relationship between the first signal and a first bandwidth part BWP, wherein the first BWP is an active BWP of a serving cell, and the first signal is a reference signal sent by a target cell,
   wherein a center frequency point of the first signal is different from a center frequency point of a second signal, a sub-carrier space of the second signal is the same as a sub-carrier space of the first BWP, and the second signal is a reference signal sent by the serving cell;
   wherein the determining, by the terminal device, whether the measurement of the first signal needs the measurement gap based on the sub-carrier space of the first signal and the positional relationship between the first signal and the first BWP, comprises:
   if the first signal is within the first BWP, and the sub-carrier space of the first signal is different from the sub-carrier space of the first BWP, the measurement of the first signal does not need the measurement gap; and
   wherein
   in a case where a frequency domain position of the first signal belongs to a FR1, if simultaneous reception of the first signal and data is not supported by the terminal device, there is a transmission restriction for the terminal device within a first time range, wherein the first time range is determined based on a time domain position of the first signal, or
   in a case where a frequency domain position of the first signal belongs to a frequency range FR2, there is a transmission restriction for the terminal device within a first time range, wherein the first time range is determined based on a time domain position of the first signal.

2. The method according to claim 1, wherein the determining, by the terminal device, whether the measurement of the first signal needs the measurement gap based on the sub-carrier space of the first signal and the positional relationship between the first signal and the first BWP, comprises:
   if the first signal is within the first BWP, and the sub-carrier space of the first signal is the same as the sub-carrier space of the second signal and the sub-carrier space of the first BWP, the measurement of the first signal does not need the measurement gap.

3. The method according to claim 1, wherein in a case where a frequency domain position of the first signal belongs to a time-division multiplexing TDD band, there is a transmission restriction for the terminal device within a first time range, wherein the first time range is determined based on a time domain position of the first signal.

4. The method according to claim 1, wherein the transmission restriction means that there is no capability for the terminal device to send an uplink signal and/or receive a downlink signal on the first signal, n1 symbols before the first signal, and n2 symbols after the first signal within a first timing window, wherein n1 and n2 are integers greater than or equal to 0.

5. The method according to claim 1, wherein the first signal is a synchronization signal block SSB or a channel status indication reference signal CSI-RS.

6. A terminal device, comprising: a processor, a transceiver, and a memory, and adapted to execute the method according to claim 1.

7. A method for determining a measurement gap, comprising:
 determining, by a network device, whether measurement of a first signal configures a measurement gap based on a sub-carrier space of the first signal and a positional relationship between the first signal and a first bandwidth part BWP, wherein the first BWP is an active BWP of a serving cell, and the first signal is a reference signal sent by a target cell,
 wherein a center frequency point of the first signal is different from a center frequency point of a second signal, a sub-carrier space of the second signal is the same as a sub-carrier space of the first BWP, and the second signal is a reference signal sent by the serving cell;
 wherein the determining, by the network device, whether the measurement of the first signal configures the measurement gap based on the sub-carrier space of the first signal and the positional relationship between the first signal and the first BWP, comprises:
 if the first signal is within the first BWP, and the sub-carrier space of the first signal is different from the sub-carrier space of the first BWP, the measurement of the first signal does not configure the measurement gap; and
 wherein
 in a case where a frequency domain position of the first signal belongs to a FR1, if simultaneous reception of the first signal and data is not supported by the terminal device, there is a transmission restriction for the network device within a first time range, wherein the first time range is determined based on a time domain position of the first signal, or
 in a case where a frequency domain position of the first signal belongs to a frequency range FR2, there is a transmission restriction for the network device within a first time range, wherein the first time range is determined based on a time domain position of the first signal.

8. The method according to claim 7, wherein the determining, by the network device, whether the measurement of the first signal configures the measurement gap based on the sub-carrier space of the first signal and the positional relationship between the first signal and the first BWP, comprises:
 if the first signal is within the first BWP, and the sub-carrier space of the first signal is the same as the sub-carrier space of the second signal and the sub-carrier space of the first BWP, the measurement of the first signal does not configure the measurement gap.

9. The method according to claim 7, wherein in a case where a frequency domain position of the first signal belongs to a time-division multiplexing TDD band, there is a transmission restriction for the network device within a first time range, wherein the first time range is determined based on a time domain position of the first signal.

10. The method according to claim 7, wherein the transmission restriction means that there is no capability for the network device to receive an uplink signal and/or send a downlink signal on the first signal, n1 symbols before the first signal, and n2 symbols after the first signal within a first timing window, wherein n1 and n2 are integers greater than or equal to 0.

11. The method according to claim 7, wherein the first signal is a synchronization signal block SSB or a channel status indication reference signal CSI-RS.

12. A network device, comprising: a processor, a transceiver, and a memory, and adapted to execute the method according to claim 7.

\* \* \* \* \*